Patented Apr. 29, 1952

2,594,313

UNITED STATES PATENT OFFICE 2,594,313

FURNACE BRAZING COMPOSITIONS

Louis G. Klinker, Griffith, Ind., assignor to The Glidden Company, Cleveland, Ohio, a corporation of Ohio No Drawing. Application July 27, 1949,
Serial No. 107,139

21 Claims. (Cl. 148—25)

This invention relates to compositions suitable for use in furnace brazing operations and in other brazing and soldering operations to supply the metallic material which unites the parts to be joined.

Furnace brazing is an art which has now been practised for well over a decade, the term "furnace brazing" being understood to refer to a furnace process in which an assembly of close-fitting parts (usually of ferrous metal) is heated in a reducing atmosphere to temperatures slightly above the melting point of copper. Metallic copper is positioned in or around the joints to be brazed, such positioning being done before the assembly is put in the furnace. When the assembly reaches and slightly surpasses the melting point of copper, the pre-positioned metallic copper melts and is drawn by capillary attraction into the close-fitting joint, thereby making a strong, sound brazed joint. In the past, the pre-positioned metallic copper has been provided on the assembly in the form of wire shapes conforming to the shape of the joint to be brazed, or as copper slugs or shot inserted in a cavity adjacent the joint, or as copper foil shapes, or as pastes of copper powder and a vehicle such as pyroxylin, ordinary machine oil, alcohol or water.

Pastes have many advantages over the wrought and formed sources of copper (foil, wire, slugs, shot, etc.) since pastes can be applied to a joint of any shape in any desired quantity, are cheaper than preformed shapes, are easier to apply, eliminate large inventories of preformed copper shapes by permitting the stocking of just one source of copper in place of the numerous shapes, sizes, weights, and types otherwise needed for various assemblies. Despite such advantages, pastes have not been found in the past to be satisfactory. Heretofore, when an organic vehicle has been used in them, the finished brazed joint usually has carried a deposite of carbon on or around it, and this deposit frequently has had to be removed from the brazed assembly before the latter could be further finished by electroplating, painting or otherwise. If an inorganic carrier is used, such as a water suspension or solution of inorganic fusible salts, such fusible salts remain as a deposit on the finished brazed joint, and, like carbon, are undesirable and must usually be removed. If a mere water or alcohol paste is used, the pastes become dry soon after the assembly has been placed in the brazing furnace, and the copper powder of the paste then is in a loose powdery form and may drop out of the intended joint, or may be vibrated out of or away from the joint as the essembly moves through the furnace, all with the ultimate result that an inadequate supply of copper is available for the intended joint, and undesirable spots or deposits of copper are formed unintentionally on areas of the assembly remote from an intended joint.

I have now found that an eminently satisfactory brazing paste can be prepared by dispersing cupreous material such as copper powder or copper oxide in a jelly-like organic carrier in the presence of a small amount of an oxidizing agent and with or without small amounts of inorganic fluxes. Powders of other joining metals such as brass, silver solders, soft solders, phosphor copper, etc. may be used similarly instead of copper. Pastes formulated with these classes of ingredients provide all of the advantages enumerated above, and in addition provide clean, carbon-free joints which can be electroplated, painted or otherwise coated directly after leaving the brazing furnace. Moreover, such pastes are non-settling; they can be applied from piston-type or other kinds of mechanical or pneumatic dispensers without gumming, galling or plugging such dispensers; they can be formulated so as to provide a paste which "runs" on the work before the brazing temperature has been reached or which, contrarily, does not "run" from its applied position; their use results in lower brazing metal costs and in a minimum of delay in starting a new assembly through a production line, and they can be used freely in any of the commonly-employed furnace atmospheres without deleteriously affecting the functions of those atmospheres.

Accordingly, it is an object of this invention to provide furnace brazing pastes having cupreous material dispersed in a gel-like organic carrier along with a small amount of inorganic oxidation agent, and with or without small amounts of organic and/or inorganic fluxes.

It is another object to provide brazing or soldering pastes having powders of brass, silver solder, soft solder, phosphor copper, or other joining metals dispersed in a gel-like organic carrier along with a small amount of inorganic oxidation agent, and with or without small amounts of organic and/or inorganic brazing or soldering fluxes.

Other incidental and ancillary objects are described above and will be apparent from the following description of the invention.

As pointed out above, a satisfactory brazing or soldering paste should be a carrier-borne dispersion capable of supplying the desired amount of copper or other joining metal to an intended joint without leaving any appreciable residue in the vicinity of the completed, brazed joint, and without interfering with the desired functions of the atmospheres commonly employed in copper brazing furnaces. Organic carriers for the finely-divided copper oxide, copper or other joining-metal powder are preferred since such organic materials decompose within the furnace into carbonaceous products which do not interfere with and may augment any reducing characteristics of the furnace atmosphere employed in making brazed or soldered joints. However, the organic vehicles which have been used in the past (e. g. pyroxylin, machine oils) leave a carbon residue in or around the finished joint thereby impairing its soundness, and/or necessitating subsequent cleaning of the brazed assembly. I have found, however, that by restricting the organic vehicles to those which deposit a relatively small amount of carbon at most, and by including in the paste a small amount of suitably selected inorganic oxidizing agent, any carbon which would tend to be deposited by the organic vehicle can be scavenged away by the oxidizing agent, thereby to leave clean, carbon-free brazed or soldered joints. Inorganic oxidizing agents are used since certain of them are relatively high-melting and do not decompose thermally below the temperatures at which their oxygen is best used in effecting the scavenging of carbon deposited by the organic carrier. The components of my pastes will now be discussed individually under the headings, The Carrier, The Oxidizing Agent, The Fluxes, and The Joining Metals.

*The carrier*

The organic carrier should be gel-like in order to overcome the tendency of the dispersed copper oxide, copper or other joining metal powder to settle. A non-settling dispersion is of particular advantage when it is to be applied to the intended joints by ejecting it from a piston-type or other mechanical applicator. Such applicators are very useful in applying the pastes since they can be adjusted to eject just the correct amount for each joint, and because they speed up the operation considerably. If a dispersion which settles is used in such applicators, the copper content of the ejected material is not uniform and may be so low as to "starve" the intended joint, thereby failing to make a strong, sound, thoroughly brazed joint. Moreover, settling of the joining metal powder source usually leads to trouble with the applicator, either by causing it to jam or stick, or to become plugged, or to be rapidly worn out by galling, abrasion, etc. Gel-like organic materials are abundant, and by suitable selection of them one can readily exclude those which would deposit unduly large quantities of carbon. I prefer to use organic materials which have a Conradson carbon value of less than about .25%. The test for Conradson value is described in the ASTM Standards, 1946, part III–A, page 120, where it is identified as Designation D189—46. Petroleum jelly, gelled vegetable drying oils, and protein gels are typical materials which may be used when selected to exclude those which have too high a Conradson carbon value. Of recent years, synthetic polymeric hydrocarbon gels derived from petroleum have become available and I particularly prefer to use them since, as a class, they are characterized by very low Conradson carbon values of consistent uniformity. This is the result of their synthesis, since they are built up from thermally-stable structural groups by polymerization. Such polymeric materials may be depolymerized again into their thermally-stable volatile constituents groups, and hence on depolymerization deposit very little carbon. I particularly prefer the synthetic saturated gels, but I also contemplate the use of such saturated gels with small amounts of unsaturated polymeric film-forming synthetic oils, or with other film-forming material, such being included when I desire to prepare a paste which after having been applied to an intended joint will dry to a film. Frequently furnace-brazing assemblies are prepared for the furnace well in advance of the time at which they are started through the furnace. While they are awaiting their turn, it is convenient to have the paste set or dry to at least a soft film, since the film of paste will not then be apt to be dislodged accidentally from its proper position on the assembly before the assembly reaches the furnace. Volatile organic and petroleum solvents and thinners as well as non-drying synthetic polymeric oils may also be used in conjunction with heat-depolymerizable synthetic gels and drying oils, to adjust viscosities, lubricating qualities, etc. of the paste. It will be understood that the synthetic materials are especially preferred because they are volatilized almost completely away from the work when the latter is being heated up to the brazing temperature. For the most part, such synthetic materials are volatilized practically completely at temperatures around 350° C. to 400° C. Hence any carbon which is deposited by the organic carrier has been formed on the work by the time these temperatures are reached. This is an important factor, since it permits the oxidizing agent to perform its scavenging function at an optimum temperature, as will be explained hereinafter in connection with the description of suitable oxidizing agents.

It should not be understood from what I have said above that only gel-like organic compounds dispersed in organic liquids are suitable as the carrier of my pastes. Gel structure or thixotropic characteristics may be secured by dispersing various heat-decomposable organic compounds in water, and I also contemplate the use of such gels in my pastes. For example, starch hydrolyzed in water forms a satisfactory gel, and various other organic materials such as gums (e. g. tragacanth, agar), polyvinyl alcohol, methyl cellulose, carboxymethyl-cellulose, and carboxymethyl starch likewise form gels in water and are suitable carrier gels for my pastes. Starch, gums, and the materials just mentioned tend to deposit carbon on the work, but such carbon deposits are a relatively small percentage by weight of the carrier and hence, like the carbon deposits formed from hydrocarbon gels of low Conradson value, can be scavenged from the work by relatively small amounts of oxidizing agent. Hence such gel carriers are suitable in my pastes where they would not be suitable if the oxidizing agent were omitted. Moreover, they carbonize at temperatures below about 400° C. so that commercially-available inorganic oxidizing agents can be used effectively for such scavenging function. Hydrolyzed starch gels and gels of the other materials mentioned in this paragraph have the further advantage that they do not soften and "run" in the furnace like the petroleum gels. Hence they are especially useful in pastes which must not "run" in the furnace. Such pastes are useful in forming fillets of copper around the brazed joints and are very useful on joints from which a "running-type" paste would tend to flow out of or away from an intended joint. On the other hand, the "running-type" pastes are useful on horizontal surfaces adjacent to intended joints, since a dab of such paste may be applied anywhere near the periphery of the joint and will "run" around the entire periphery soon after the assembly becomes heated in the furnace. Thus much time may be saved during the application of the paste, since one dab of a "running-type" paste on such a joint may be applied faster than several dabs. However, if a fillet is wanted on such a joint, it is better to place a ring of the "non-running-type" paste around the joint, as such a ring will afford a more uniform distribution of the copper which ultimately forms the fillet. It should be understood, however, that both types of paste will produce sound, strong brazed joints since the copper content of even a single properly-proportioned dab of paste will be drawn into the entire joint by capillary action when the copper becomes molten.

While even heavy petroleum products having Conradson values of 5% or more might conceivably be used in my pastes, they would require the presence of so much oxidizing agent to scavenge the resulting carbon deposits that the residues of the oxidizing agent would become objectionable. On a strictly empirical basis, the weight of, say, potassium nitrate, should preferably be at least 5 times the weight of the total carbon derivable from the carrier as determined by the Conradson carbon test. For example, if a paste contains 4 lbs. of a carbonaceous carrier having a Conradson carbon residue of 1%, the total weight of carbon residue derivable from said carrier would be .04 lb., and five times this amount, or .20 lb. of potassium nitrate would be needed in the paste. If the Conradson carbon value were 5%, then, of course, one pound of potassium nitrate would be needed. Such a large amount of nitrate would lead to heavy inorganic deposits around the brazed joints and would probably be as objectionable as the carbon deposit they replaced. Accordingly, I prefer to use carriers having Conradson carbon values below about ½% and particularly prefer the synthetic hydrocarbon gels or other suitable jellable organic materials having Conradson values below about .25%.

The oxidizing agent

Numerous inorganic oxidizing agents may be used to scavenge the carbon which may be deposited by the carrier. Carbonization of the ingredients of the carrier usually is completed at temperatures below 400° C., so that the oxidizing agent should be one which is capable of giving off oxygen at least up to such temperatures. The oxidizing agents should not melt below about 200° C. and should not begin to decompose below about 300° C. If they decompose at lower temperatures their oxygen is apt to be wasted in oxidizing volatile materials instead of being retained to attack the carbon deposits. Alkali metal nitrates, nitrites and peroxides are useful, as are the alkali-earth metal nitrates and peroxides. I prefer the nitrates or nitrites to the peroxides, however, because they provide nascent oxygen at temperatures between about 300° C. and 500° C. Moreover, they do not melt below about 250° C. and hence are not apt to flow away from the paste before their nascent oxygen can scavenge the carbon deposits. The peroxides are useful, nevertheless, especially because they are higher melting and are chemically stable at higher temperatures than the nitrates or nitrites. Chlorates are seldom useful because of their nearly explosive potency and because of the chlorides derived from them. In most internally heated electric furnaces, such as are commonly used in furnace brazing operations, chlorides and other halides attack the work, the furnace linings and the electric resistors and hence are objectionable. Nitrates, nitrites and peroxides on the contrary give rise to non-corrosive relatively-inert decomposition products which can pass into the furnace atmosphere, without causing damage to the furnace or the work, and without materially affecting the neutral or reducing characteristics of the furnace atmosphere.

The mechanism of the reaction between nitrates or nitrites and carbon in a reducing atmosphere at temperatures around 400° C. is far from clear. However, without being bound by the theory involved in the following equation, I believe that this equation may serve to approximate the mechanism:

$$3C + 2KNO_3 \rightarrow K_2CO_3 + CO_2 + CO + N_2$$

On the basis of this equation 2 mols of $KNO_3$ (202 gram-molecular weights) react with 3 moles of carbon (36 gram-molecular weights), so that the weight ratio between $KNO_3$ and C is 202 to 36, or 5.6 to 1. For practical effectiveness a weight ratio of 5 to 1 is satisfactory, and lower ratios may be used particularly when neutral furnace atmospheres prevail. It will be understood that the practical effectiveness of a particular oxidizing agent is related to the degree of balance obtained between the formation of carbon at a given temperature on one hand and the release of oxygen from the oxidizing agent at that same temperature on the other hand. If the selection of ingredients in the carrier is such that the oxygen of the oxidizing agent is liberated to a large extent before the organic components have deposited their carbon residues, such liberated oxygen is largely wasted so far as scavenging is concerned. In such cases, the proportions of oxidizing agent to organic carbon-depositing materials may have to be rather high in order to secure the desired scavenging action. For general utility, however, I may use a weight ratio of at least 4 to 1 for alkali-metal nitrates and nitrites, and I prefer a ratio of at least 5 to 1. When alkali-earth metals or heavy metals replace alkali metals, upward adjustments must, of course, be made in these ratios on the basis of the larger molecular weights involved. Comparable ratios may be used for peroxides, since the formula weights required per equivalent of available oxygen are not greatly different from the formula weights of corresponding nitrates or nitrites.

The fluxes

Various fluxing agents may be included in the pastes to assist in the development of strong sound brazes. The function of such fluxing agents is as much that of inducing the molten copper to wet the iron as it is to induce the finely-divided particles of copper to wet each other thereby to merge together into a continuous molten phase capable of being drawn by capillary action into the intended joint. Borax, boric acid, and mixtures thereof have been found to be effective fluxes in my pastes, and amounts of more than about 2% are seldom needed. Volatile chloride fluxes are preferably avoided because of the corroding effects which they have on the work, the furnace lining and the electric resistors, and because they are volatilized away from the work long before the melting point of copper has been reached. It should be pointed out here that the residues resulting from the oxidizing agents ($K_2CO_3$, $Na_2CO_3$, etc.) may have some beneficial fluxing action particularly in the presence of borax or boric acid. Such oxidic compounds as oxides, carbonates, etc. may be intentionally added to the pastes, if desired, to augment such amounts as are derived from decomposition and reduction of the oxidizing agents. It will be understood that various commonly recognized fluxes or flux combinations suitable for molten copper may be used so long as the residues thereof are sufficiently water soluble to permit them to be cleaned from the work, if necessary. Silver nitrate may be used as a combination oxidizing agent and flux. The residue of silver, which is formed by reaction of the nitrate with carbon, alloys with the copper thereby lowering its melting point and inducing the merger of adjacent metal particles into a freely-liquid molten mass.

The fluxes may be finely ground and then mixed into the paste in a dry form. However, I have found that the fluxes may be distributed more uniformly, and therefore more effectively, if they are dissolved in water and are then emulsified with the oil carrier. In such case an emulsifying agent may be used, and an anti-spattering agent is desirable to overcome the spattering effect of such water on the paste. Frequently the antispattering agent is a sufficiently strong emulsifying agent that no separate emulsifying agent is needed. In the case of water-base gel pastes, such as prepared from hydrolyzed starch, the water-soluble fluxes can be dissolved directly into the carrier to effect their molecular dispersion throughout the paste. If water-insoluble fluxes are used, they may sometimes be dispersed through the paste by employing mutual solvents. For example, the water-base gel pastes are apt to freeze while being shipped in cold weather, and an anti-freeze such as ethylene glycol may be included in the paste to lower the freezing point. In such pastes, the ethylene glycol may dissolve certain fluxes which would not otherwise be soluble in the paste. It will be understood that I contemplate dispersing the fluxes through the pastes by means of any of the conventional or known methods.

The joining metals

Those skilled in the art recognize that a wide variety of metallic solders, brazing or joining materials are already available for use in uniting different combinations of metallic parts. I have already described the use of pure copper as a furnace brazing material for ferrous and other high melting-point metals or alloys. Binary phosphorus-copper alloys, and various ternary phosphorus-bronze alloys are also well known. Brass is a common "brazing" solder and nickel-silver alloys are commonly known as "brazing" or "spelter" solders. Hard solders, silver-rich silver solders and low-melting silver solders are recognized classifications of various solder compositions, some of which are useful in joining a wide variety of metals or alloys and others of which are compounded to make them especially useful in joining particular combinations of metals and alloys. Soft solders are also well-known as joining materials. A complete list of all soldering or joining metals and alloys and an indication herein of the field of use of each would serve no useful purpose other than to consolidate information which is already common knowledge in the joining art. For this reason, no extended discussion of joining metal compositions is here presented. So far as the present invention is concerned, it may be applied so as to prepare a soldering or brazing paste of any joining metal or alloy which can be prepared in the form of powder, and/or which can be prepared by reducing in situ one or more metals from an appropriate metallic compound. I contemplate the use also of composite metal powders, such as tin-coated copper powder, copper-coated silver powder, silver-coated copper powder, nickel-coated cadmium powder or vice versa, cadmium-coated brass powder, and many others, it being understood that such composite powders by themselves or in admixture with other pure metal, alloy or composite powders are included in the paste to yield joining material of desired composition appropriate to the natures of the parts being joined. I also contemplate the use in my pastes of such fluxes as are recognized to be appropriate to the joining operation on which the paste is to be used.

The following examples illustrate the principles of my invention:

Example 1

One gallon of paste was prepared from 17.5 lbs. of minus 150 mesh copper powder; 0.350 lbs. of minus 100 mesh potassium nitrate; and 5 lbs. of a synthetic hydrocarbon jelly carrier having a Conradson value of 0.16% and having the following properties:

| | |
|---|---|
| API gravity_____degrees__ | 32.0 |
| Four point, °F_____ | 115 |
| Flash, °F_____ | 330 |
| Fire, °F_____ | 375 |
| Viscosity at 210° F. SU [1]_____seconds__ | 51.0 |

[1] Saybolt-Universal viscometer.

The potassium nitrate was stirred into the hydrocarbon jelly carrier until uniformly dispersed therethrough, after which the copper powder was gradually introduced with agitation until all of the copper powder had been added and a smooth paste had been formed.

The paste can be applied to ferrous metal assemblies by extruding it from a piston-type or pneumatic applicator, and the paste produces carbon-free, sound brazed joints between the parts of the assemblies when the latter are furnace-brazed at about 2050° F. in either a cracked ammonia atmosphere, a hydrogen atmosphere, or an atmosphere composed largely of hydrogen and carbon monoxide.

The synthetic hydrocarbon jelly carrier employed above was prepared by blending about 8 parts of a synthetic unctuous jelly-like petrolatum with about 2 parts of a synthetic light-bodied viscous hydrocarbon oil. The petrolatum had the following properties:

| | |
|---|---|
| API gravity_____degrees__ | appr. 33.0 |
| Flash, °F. minimum_____ | appr. 350 |
| Fire, °F. minimum_____ | appr. 400 |
| Viscosity, SU [1] at 210° F___seconds___ | appr. 65 |
| Melting point, °F_____ | 115–125 |
| Conradson carbon_____percent__ | appr. .19 |

[1] Saybolt-Universal viscometer.

The hydrocarbon oil had the following general characteristics:

| | | |
|---|---|---|
| API gravity | degrees | 25 to 30 |
| Flash, °F | | 270 to 300 |
| Fire, °F | | 310 to 340 |
| Viscosity at 100° F., SU[1] | seconds | 55 to 65 |
| Conradson carbon | percent | .01 |

[1] Saybolt-Universal viscometer.

*Example 2*

One gallon of brazing paste was prepared from the following ingredients:

| | | |
|---|---|---|
| Minus 325 mesh copper powder | lbs | 17.5 |
| Potassium nitrate | lbs | .175 |
| Borax | lbs | .0875 |
| Water | lbs | 0.70 |
| Synthetic hydrocarbon jelly carrier of Example 1 | lbs | 2.5 |
| Synthetic hydrocarbon oil of Example 1 | lbs | 2.5 |
| Emargol (anti-spattering agent) | grams | 10.0 |
| Petroleum sulfonate (wetting agent) | do | 20.0 |

The paste was prepared by mixing the hydrocarbon jelly carrier, the hydrocarbon oil, the wetting agent and the anti-spattering agent together until thoroughly blended. The anti-spattering agent known commercially as Emargol (a product of the Emulsol Corp., Chicago, Illinois) is composed essentially of the sodium salts of sulfoacetate derivatives of mono- and di-glycerides. Such and related anti-spattering agents are described in U. S. Patent No. 1,917,255, issued July 11, 1933, to Benjamin R. Harris. The potassium nitrate, borax and boric acid were dissolved in the water and the resulting solution was brought up to a boil. The boiling solution was added to the copper powder with vigorous agitation. The fluxed copper powder was then gradualy added to the blended hydrocarbon vehicle until all had been introduced and a smooth paste had been produced.

The paste has been found to be very satisfactory for all furnace-brazing work in any of the usual brazing atmospheres.

*Example 3*

One gallon of paste was prepared from the following ingredients:

| | | |
|---|---|---|
| Minus 325 mesh cuprous oxide (bright red) | lbs | 25.57 |
| Potassium nitrate | lbs | .225 |
| Borax | lbs | .1125 |
| Boric acid | lbs | .1125 |
| Water | lbs | 0.90 |
| Synthetic hydrocarbon jelly carrier of Example 1 | lbs | 2.0 |
| Synthetic hydrocarbon oil of Example 1 | lbs | 2.0 |
| Petroleum sulfonate (wetting agent) | grams | 20 |
| Anti-spattering agent | do | 10 |

The hydrocarbon jelly carrier, hydrocarbon oil, wetting agent and anti-spattering agent were thoroughly mixed together until uniformly blended. The potassium nitrate, borax and boric acid were dissolved in boiling water, and the hot solution was poured with agitation into the blended hydrocarbon vehicle. When the solution had been completely dispersed in the vehicle the cuprous oxide was gradually added and agitation of the resulting paste was continued for about an hour to secure a thoroughly blended and smooth paste.

The paste has been found to produce clean, sound, carbon-free brazed joints under any of the usual furnace-brazing conditions.

*Example 4*

One gallon of brazing paste was prepared from the following ingredients:

| | Pounds |
|---|---|
| Minus 325 mesh copper powder | 20.0 |
| Starch vehicle | 6.0 |
| Potassium nitrate | .20 |
| Borax | .10 |
| Boric acid | .10 |
| Water | .80 |

The starch vehicle was prepared by mixing 20 lbs. of water with 20 lbs. of ethylene glycol, and then dispersing 2 lbs. of starch in ½ gallon of this mixture while cold. The balance of the mixture was brought to boiling and then poured into the ½ gallon of dispersed starch. The whole was then boiled gently for 20 minutes while being stirred rapidly. The gelled solution was then allowed to cool, and 6 lbs. of the gelled solution was used in preparing the paste. The borax, boric acid, and potassium nitrate were dissolved in .80 lb. of water and the solution was dispersed in the 6 lbs. of gelled starch solution. The copper powder was then added gradually with stirring and after all of the copper had been added the whole was stirred for one hour to produce a smooth paste.

Tests of the paste showed it to produce very satisfactory, clean, carbon-free brazed joints, and to exhibit little to no tendency to "run" in the furnace.

*Example 5*

One gallon of paste was prepared from the following ingredients:

| | Pounds |
|---|---|
| Black copper oxide | 21.34 |
| Potassium nitrate | .175 |
| Borax | .0875 |
| Boric acid | .0875 |
| Water | .700 |
| Starch vehicle | 5.5 |

The black copper oxide was 95% minus 325, all through 60 mesh, and was composed of 80–84% copper. The starch vehicle and the paste were prepared in the manners described in Example 4 above.

Ethylene glycol was used as a part of the vehicle in Examples 4 and 5 because it decomposes thermally into carbon monoxide and hydrogen, and hence does not materially alter the usual reducing atmospheres found in brazing furnaces. Other organic anti-freeze materials may be substituted for it, however. I may use any cuprous material in my pastes which under the conditions normally prevailing in brazing furnaces provides metal copper. Thus, copper powder, cuprous oxide, cupric oxide, copper carbonate, etc. are suitable cupreous materials. I do not regard the oxidic copper compounds to be oxidizing agents capable of scavenging the carbon residues derived from the carriers. They may function to a small extent in such manner, but I have found that brazing pastes prepared from copper oxides dispersed in a carrier without any added oxidizing agent invariably form brazed joints which are marked with some carbon residues. Hence whatever oxidizing effect the copper oxides have in scavenging carbon, the effect is insufficient to remove more than a small amount.

It will be understood that an important consideration in formulating a brazing paste is that of incorporating the largest possible quantity of cupreous material into the smallest possible quantity of vehicle without losing plasticity and without encountering settling problems. The gelled vehicles permit a practical attainment of these objectives. The use of gelled organic vehicles makes it possible to rely on thermal decomposition of the organic material to dissipate most of the vehicle from the vicinity of an intended brazed joint, while the use of an inorganic oxidizing agent which is stable at least up to the carbonization temperature of the organic vehicle permits the oxygen of the oxidizing agent to be liberated at such time or temperature as it will be most effective in scavenging the carbonized residue. Accordingly, the essential ingredients of my pastes cooperate together in a novel manner to provide a paste which avoids the disadvantages of prior art pastes while at the same time giving trouble-free pastes which may have a high ratio of copper to vehicle. It will be understood that the principles of my invention can be carried out in wide latitudes of formulation, and my invention should accordingly be restricted in scope only to the extent indicated by the following claims.

My pastes may be used for brazing iron, steel, cast iron, cutting tool carbides, molybdenum, tungsten, stainless steel, nickel, precious metals, and various other metals and alloys, either to themselves or to any of the other materials here mentioned, it being understood that a solder or brazing material of appropriate composition is selected with regard to the metals or alloys sought to be joined.

Having disclosed my invention, what I claim is:

1. A composition particularly adapted for use at elevated temperatures in making carbon-free furnace-brazed metallic joints, said composition comprising essentially: (A) a carrier which is a gel of organic material, said carrier having a Conradson residue below about 0.5%; (B) inorganic oxidizing agent having a melting point above about 200° C. and capable of oxidizing carbon by reaction and decomposition at higher temperatures, said oxidizing agent being further selected from the group consisting of the alkali-metal nitrates, nitrites and peroxides and the alkali-earth-metal nitrates and peroxides, and being present in an amount proportional to at least 4 parts thereof by weight for each part of carbon in said Conradson residue, but not substantially in excess of the amount thereof required to scavenge by oxidation all carbon which would be deposited by said carrier in a furnace-brazing operation in the absence of the oxidizing agent; and (C) finely-divided solid material adapted to yield at the brazing temperature a molten brazing metal, said material being selected from the group consisting of metal powders and reducible oxidic compounds of brazing metals; said brazing-metal-yielding material and said oxidizing agent being uniformly dispersed in a sufficient amount of said carrier to provide a smooth paste.

2. A composition as claimed in claim 1, wherein said carrier includes organic film-forming material.

3. A composition as claimed in claim 2 wherein the carrier has a Conradson residue below about 0.25% and is composed of synthetic polymeric hydrocarbon materials which are heat depolymerizable.

4. A composition as claimed in claim 1 wherein the carrier has a Conradson residue below about 0.25% and is composed of synthetic polymeric hydrocarbon materials which are heat depolymerizable.

5. A composition as claimed in claim 1 wherein said carrier is an aqueous gel.

6. A composition as claimed in claim 5 wherein the carrier is an aqueous gel of hydrolyzed starch.

7. A composition as claimed in claim 5 wherein the carrier is an aqueous gel of methyl cellulose.

8. A composition as claimed in claim 5 which includes a water-soluble organic antifreeze.

9. A composition as claimed in claim 8 wherein the antifreeze is ethylene glycol.

10. A composition particularly adapted for use at elevated temperatures in making carbon-free furnace-brazed metallic joints, said composition comprising essentially: (A) a carrier which is a gel of organic material, said carrier having a Conradson residue below about 0.5%; (B) inorganic oxidizing agent having a melting point above about 200° C. and capable of oxidizing carbon by reaction and decomposition at higher temperatures, said oxidizing agent being further selected from the group consisting of the alkali-metal nitrates, nitrites and peroxides and the alkali-earth-metal nitrates and peroxides, and being present in an amount proportional to at least 4 parts thereof by weight for each part of carbon in said Conradson residue, but not substantially in excess of the amount thereof required to scavenge by oxidation all carbon which would be deposited by said carrier in a furnace-brazing operation in the absence of the oxidizing agent; (C) finely-divided solid material adapted to yield at the brazing temperature a molten brazing metal, said material being selected from the group consisting of metal powders and reducible oxidic compounds of brazing metals; and (D) a small amount of flux which is substantially non-volatile at temperatures below the intended brazing temperature; said brazing-metal-yielding material, said oxidizing agent and said flux being uniformly dispersed in a sufficient amount of said carrier to provide a smooth paste.

11. A composition as claimed in claim 10, wherein the carrier includes organic film-forming material.

12. A composition as claimed in claim 11 wherein the carrier has a Conradson residue below about 0.25% and is composed of synthetic polymeric hydrocarbon materials which are heat depolymerizable.

13. A composition as claimed in claim 10 wherein the carrier has a Conradson residue below about 0.25% and is composed of synthetic polymeric hydrocarbon materials which are heat depolymerizable.

14. A composition as claimed in claim 10 wherein said carrier is an aqueous gel.

15. A composition as claimed in claim 14 which includes a water-soluble organic antifreeze.

16. A composition particularly adapted for use in preparing substantially non-carbon-depositing furnace-brazing pastes, said composition comprising essentially: (A) a carrier which is a gel of organic material, said carrier having a Conradson residue below about 0.5%; and (B) inorganic oxidizing agent having a melting point above about 200° C. and capable of oxidizing carbon by reaction and decomposition at higher temperatures, said oxidizing agent being further selected from the group consisting of the alkali-metal nitrates, nitrites and peroxides and the alkali-earth-metal nitrates and peroxides, and being present in an amount proportional to at least 4 parts thereof by weight for each part of carbon in said Conradson residue, but not substantially in excess of the amount thereof required to scavenge by oxidation all carbon which would be deposited by said carrier in a furnace-brazing operation in the absence of the oxidizing agent; said oxidizing agent being disseminated substantially uniformly through said carrier.

17. A composition as claimed in claim 16 wherein said carrier includes organic film-forming material.

18. A composition as claimed in claim 17 wherein the carrier has a Conradson residue below about 0.25% and is composed of synthetic polymeric hydrocarbon materials which are heat depolymerizable.

19. A composition as claimed in claim 16 wherein the carrier has a Conradson residue below about 0.25% and is composed of synthetic polymeric hydrocarbon materials which are heat depolymerizable.

20. A composition as claimed in claim 16 wherein said carrier is an aqueous gel.

21. A composition as claimed in claim 20 which includes a water-soluble organic antifreeze.

LOUIS G. KLINKER.

REFERENCES CITED

The following references are of record in the file of this patent:

UNITED STATES PATENTS

| Number | Name | Date |
|---|---|---|
| 804,664 | Leisel | Nov. 14, 1905 |
| 829,155 | Hopper | Aug. 21, 1906 |
| 2,363,910 | Swaney | Nov. 28, 1944 |
| 2,474,863 | Rinkenback et al. | July 5, 1949 |
| 2,480,723 | Evans et al. | Aug. 30, 1949 |

FOREIGN PATENTS

| Number | Country | Date |
|---|---|---|
| 8,466 | Great Britain | June 25, 1903 |
| 415,181 | Great Britain | Aug. 23, 1934 |
| 470,868 | Great Britain | Aug. 24, 1937 |